United States Patent
Naddor

(10) Patent No.: US 8,360,333 B2
(45) Date of Patent: Jan. 29, 2013

(54) HD BARCODE

(76) Inventor: David J. Naddor, Johns Creek, GA (US)

(*) Notice: Subject to any disclaimer, the term of this patent is extended or adjusted under 35 U.S.C. 154(b) by 100 days.

(21) Appl. No.: 13/079,661

(22) Filed: Apr. 4, 2011

(65) Prior Publication Data

US 2011/0240749 A1    Oct. 6, 2011

Related U.S. Application Data

(60) Provisional application No. 61/341,835, filed on Apr. 6, 2010.

(51) Int. Cl.
*G06K 19/06* (2006.01)
(52) U.S. Cl. ........................ 235/494; 235/454
(58) Field of Classification Search .................. 235/494, 235/454, 462.01, 472.01, 375
See application file for complete search history.

(56) References Cited

U.S. PATENT DOCUMENTS

| | | | | |
|---|---|---|---|---|
| 5,545,890 | A * | 8/1996 | Houghton et al. | 235/494 |
| 7,428,996 | B2 * | 9/2008 | Pintsov et al. | 235/462.09 |
| 7,540,429 | B2 * | 6/2009 | Lapstun et al. | 235/494 |
| 7,694,889 | B2 * | 4/2010 | Sonoda et al. | 235/494 |
| 2007/0108302 | A1 * | 5/2007 | Pintsov et al. | 235/494 |
| 2009/0230193 | A1 * | 9/2009 | Al-Hussein et al. | 235/462.11 |
| 2011/0240749 | A1 * | 10/2011 | Naddor | 235/494 |

* cited by examiner

*Primary Examiner* — Thien M Le
(74) *Attorney, Agent, or Firm* — Luis Figarella

(57) ABSTRACT

A bi-directional two-dimensional (2D) matrix barcode symbology for use with bar code, cell phones and other optical readers. A finder structure includes indicia for locating data blocks containing bytes of information encoded through bi-directional and orthogonal lines containing individual bits of information. Individual blocks contain error correction information, and are formed into 2×2 superblocks used to build larger codes. Intrinsic prefix information provides a redundant geometric identification for individual blocks within the overall structure, providing a built-in mapping of the overall structure, even when portions are missing or undecodable. The overall symbol has a second set of error correction parameters for further redundancy. The symbology is a versatile symbology in that the number of check data blocks is user selectable to provide the desired level of error correction.

6 Claims, 12 Drawing Sheets

Figure 4A

| Row | Column | All except LSB (must be even) | Least significant bit |
|---|---|---|---|
| odd | odd | R<br>number of rows in symbol | error correction number AND 8 |
| odd | even | C<br>number of columns in symbol | error correction number AND 4 |
| even | odd | r<br>this row | error correction number AND 2 |
| even | even | c'<br>this column | error correction number AND 1 |

Figure 4B

| Error Correction "number" or Level (ECL) | Error correction bytes per group of 48 | User data bytes per group of 48 | Error correction overhead |
|---|---|---|---|
| 0 | 4 | 44 | 8.33% |
| 1 | 6 | 42 | 12.50% |
| 2 | 8 | 40 | 16.67% |
| 3 | 10 | 38 | 20.83% |
| 4 | 12 | 36 | 25.00% |
| 5 | 14 | 34 | 29.17% |
| 6 | 16 | 32 | 33.33% |
| 7 | 18 | 30 | 37.50% |
| 8 | 20 | 28 | 41.67% |
| 9 | 22 | 26 | 45.83% |
| 10 | 24 | 24 | 50.00% |
| 11 | 26 | 22 | 54.17% |
| 12 | 28 | 20 | 58.33% |
| 13 | 30 | 18 | 62.50% |
| 14 | 32 | 16 | 66.67% |
| 15 | 34 | 14 | 70.83% |

ID BARCODE

PATENTS CITED

The following documents and references are incorporated by reference in their entirety, Priddy et al (U.S. Pat. No. 5,329,107), Longacre et al (U.S. Pat. No. 5,591,956) Chandler et al (U.S. Pat. Nos. 4,874,936 and 4,896,029).

FIELD OF THE INVENTION

The present invention relates to data transmission, and more particularly to method and system for transmitting data between two devices based on bi-directional two-dimensional symbols or barcode technology.

DESCRIPTION OF THE RELATED ART

With the increased acceptance that resulted from its early successes, the use of bar codes and bar code readers has expanded into an ever widening range of applications, including many for which they were not originally designed. Despite the advent of always on, wireless connectivity, there is still a great need for the creation of graphical representations containing variable amounts of data that may be decoded by portable devices.

In some applications, the ability to carry in a printed fashion text, image, graphics, URLs, web-site links (even audio and video), machine instructions and other data, and being able to robustly and repeatedly input these through imaging means into another machine has value. These applications call for the reading of bar code symbols which encode more data than is practicable with early one-dimensional (1D) bar code symbologies. As a result, so called 2D symbols, barcodes, bar codes or symbologies were developed which increased the density with which data was encoded.

These two dimensional (2D) matrix symbologies have been developed which are capable of storing a quantity of data that is substantially larger than is possible with 1D symbologies of any reasonable size. Examples of 2D symbologies are described in Priddy et al (U.S. Pat. No. 5,329,107), Longacre et al (U.S. Pat. No. 5,591,956) and Chandler et al (U.S. Pat. Nos. 4,874,936 and 4,896,029). These 2D matrix codes have the added advantage of being readable when scanned in any orientation.

In spite of the advantage of greatly increased data densities, most 2D bar code symbologies have not come into widespread use. Among the limitations, is the fact that lost or damaged finder patterns affect locating them, users invariably trade safety of error correction for more data capacity (thereby weakening the redundancy required to extract the data from scanning errors), and other limitations. Prior to the present invention, many attempts have been made to devise 2D symbologies which are relatively insensitive to the above-mentioned effects and/or to develop 2D bar code readers which are sophisticated enough to correct for them.

While approaches such as that described in the latter patent achieve a certain measure of success, they require the utilization of such sophisticated software that a read operation cannot be performed by available microprocessors at a reasonable cost within a reasonable amount of time. Thus a need exists for a 2D symbology that allows data to be read accurately by microprocessors in a relatively short time and at a reasonable cost.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect, the invention pertains to optically readable two dimensional symbols with a finder structure comprised of a solid border defining the perimeter of an area, said border being shared with neighboring areas, each of said areas having first and second major axes which are substantially perpendicular to one another, each said area having within its perimeter an internal bi-directional data representation structure comprised of one or more locations in each of the horizontal and vertical directions, named respectively rows and columns, with each of row being filled with one or more horizontal lines or spaces, and each column being filled with one or more vertical lines or spaces, in order to represent the zero or one bits of a binary signal, a data block representation structure formed by the grouping into bytes of said bits, said block being comprised of one or more block data bytes and two or more block error check bytes that encode error correction data for the block, an overall symbol data representation structure comprised of one or more data groups, each said group comprised of three or more data bytes from said blocks, with each group containing one or more data bytes and two or more group error check bytes that encode error correction data for each said individual group, the ratio of group bytes to error correction check bytes being selectable from one or more discrete group ECC levels, and a superblock structure used to define a prefix value for each said data block, said superblock being formed by the grouping of four neighboring data blocks, wherein said prefix value is a function of each individual data block geographic location within the symbol and the symbol ECC level.

In another aspect, the area defined by the perimeter is square, each said data representation row is comprised of lines representing eight bits, and each said column is comprised of lines representing eight bits, the data block is comprised of seven horizontal rows and seven vertical columns, with each said column or row representing a byte, each block is comprised of twelve data bytes and two block error check bytes, the data groups are comprised of 48 bytes, and there are sixteen discrete user selectable group ECC-levels. In another aspect, the significantly central portion of some of the said vertical and/or horizontal lines is augmented by the creation of a bulge, block, dot, square or such other feature.

In another aspect, the optically readable two dimensional symbol is comprised of a finder structure comprised of a solid border defining the perimeter of a significantly square area, said border being shared with one or more neighboring areas, each of said areas having first and second major axes which are substantially perpendicular to one another; each said area having within its perimeter an internal bi-directional data representation structure comprised of seven horizontal and seven vertical directions, named respectively rows and columns, with each of row being filled with eight horizontal lines or spaces, and each column being filled with eight vertical lines or spaces, in order to represent the zero or one bits of a binary signal; a data block representation structure formed by the grouping into fourteen bytes of said eight bits, said block being comprised of twelve data bytes and two error check bytes that encode error correction data for the block; an overall symbol data representation structure comprised of one or more data groups, with each said data group containing one or more data bytes and two or more group error check bytes, and the total number of bytes in the each group being 48 bytes for each said individual data group, the ratio of group bytes to error correction check bytes being selectable from one of sixteen discrete group ECC levels; and a superblock structure used to define a prefix value for each said data block, said superblock being formed by the grouping of selected four neighboring data blocks, wherein said prefix value is a function of each individual data block geographic location within the symbol and the symbol ECC level. In another aspect, the significantly central portion of some of the said vertical and/or horizontal lines is augmented by the creation of a bulge, block, dot, square or such other feature.

Other features and advantages of the present invention will become apparent upon examining the following detailed description of an embodiment thereof, taken in conjunction with the attached drawings.

BRIEF DESCRIPTION OF THE DRAWINGS

FIGS. 4A and 4B show tables containing the Prefix generation rule and group-level ECC generation, according to an exemplary embodiment of the invention.

DETAILED DESCRIPTION OF THE PREFERRED EMBODIMENT

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Two dimensional symbologies or 2-D barcodes take advantage of two principal disciplines. The first, is the graphical representation of the data, the second is the use of error correction methodologies to account for the expected errors in symbol representation coming from scanning misinterpretations or errors. In this discussion, we will first point out the distinct graphical advantages of the invention (also called the HD Symbol, HD Symbol HD bar code or HDBC), and later will point out the Error Correction (ECC) advantages of having two or more separate ECC mechanisms.

Figure 1:
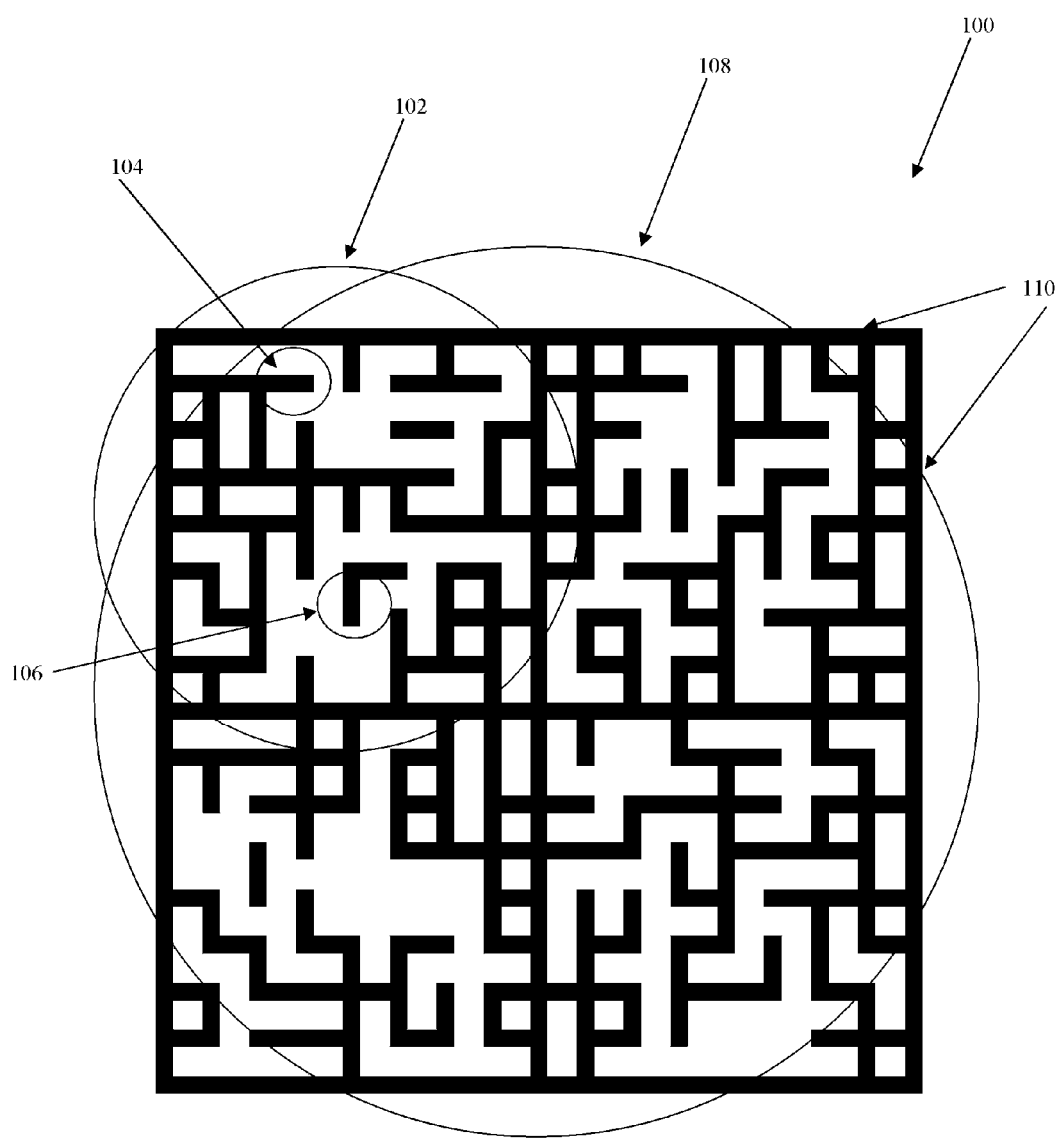
FIG. 1 shows an illustration of a four block HD barcode symbol, according to an exemplary embodiment of the invention.
Figure 2:
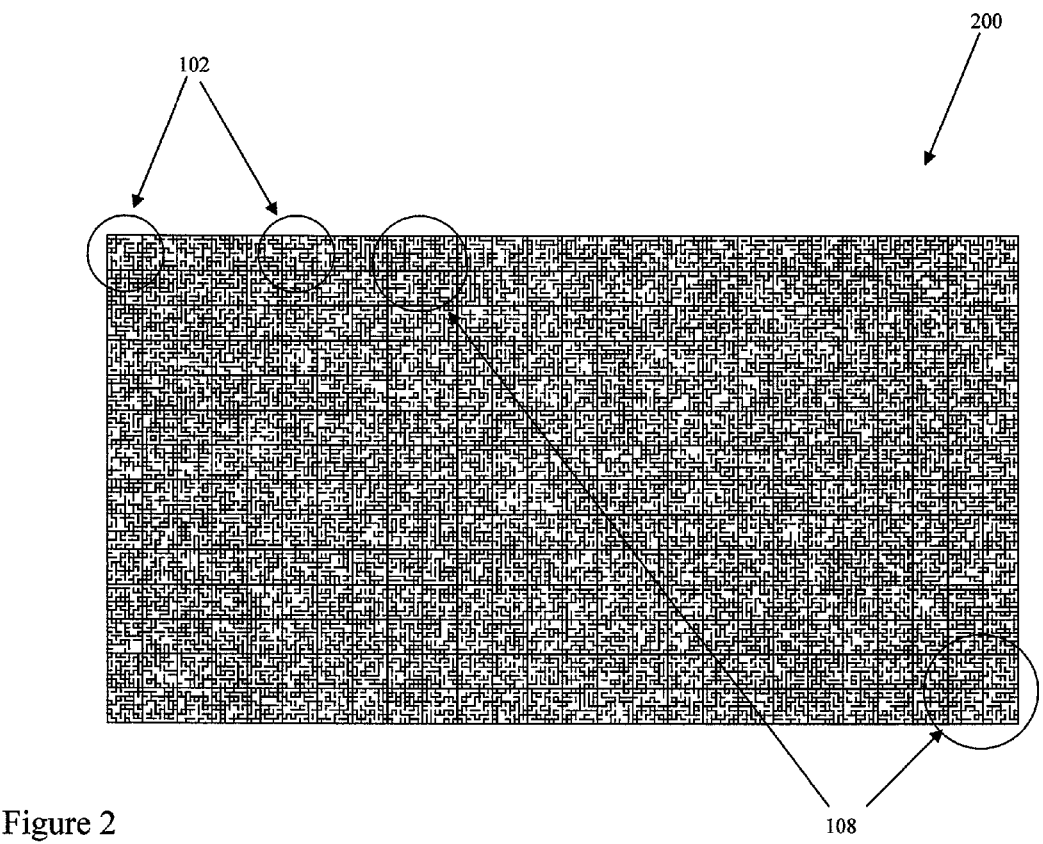
FIG. 2 shows an illustration of a 168 block HD Symbol, according to an exemplary embodiment of the invention.

Referring to FIG. 1, there is shown a representative example of the HDBC 100 in its smallest configuration, a 2×2 superblock 108 formed from four basic data blocks 102. The symbol consists of data blocks arranged in a parallelogram (may be a rectangle or a square). The number of rows and the number of columns must both be even. Utilizing this basic superblock, the HDBC may be built as small as 2×2 100, or as a 14×26 200 as seen in FIG. 2. Within this figure, we can identify individual blocks 102, as well as superblocks 108 formed from these. The largest possible symbol contains a matrix of 254×254 blocks (or 127×127 superblocks). Such a symbol when using 48 byte data groups and 4 bytes of Error check bytes per data group would carry 709,676 bytes of data.

Figure 3:
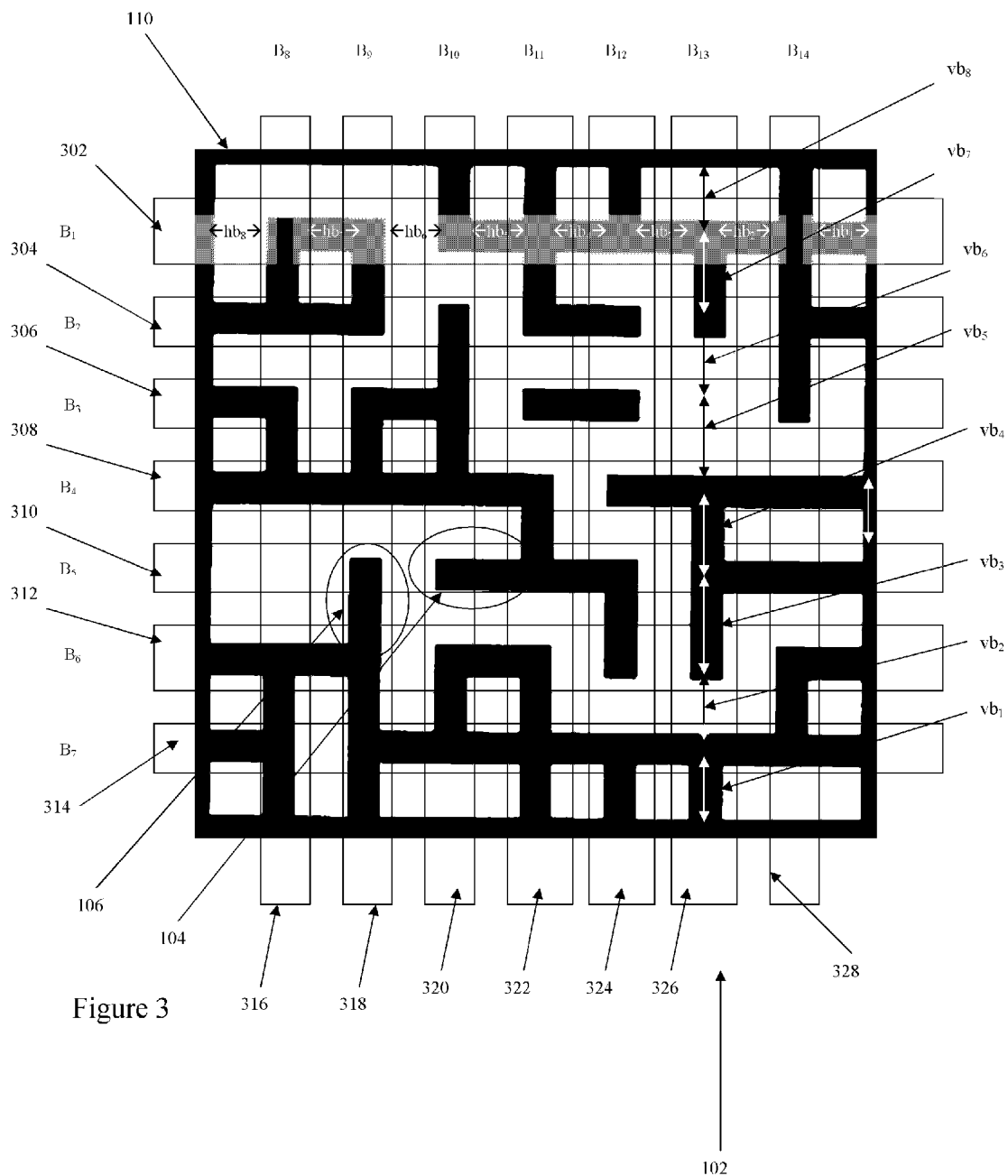
FIG. 3 shows an illustration of the bit, byte arrangement within an HD Symbol block, according to an exemplary embodiment of the invention.
Figure 9:
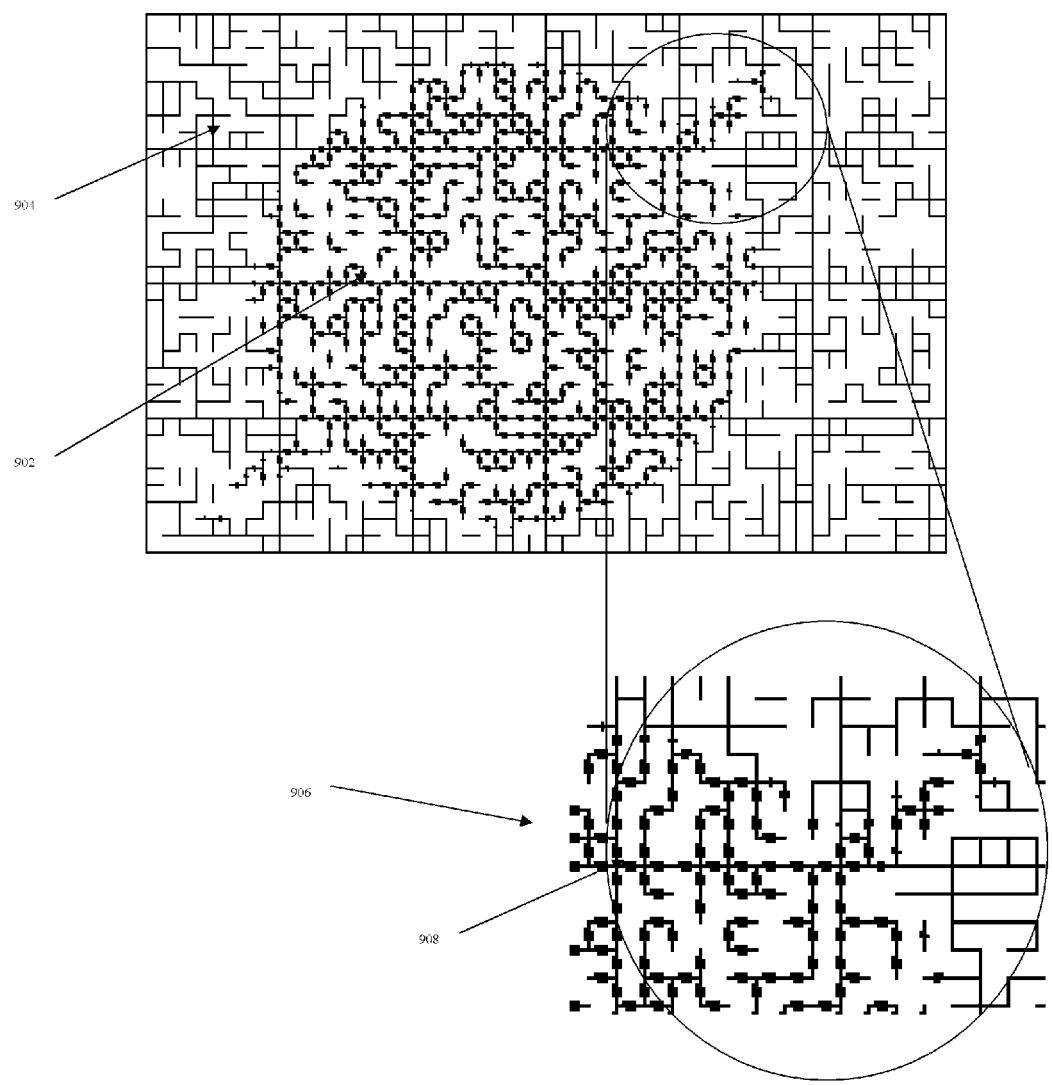
FIGS. 9 and 10 show illustrations of HD Symbols that embed graphics, according to an exemplary embodiment of the invention.
Figure 10:
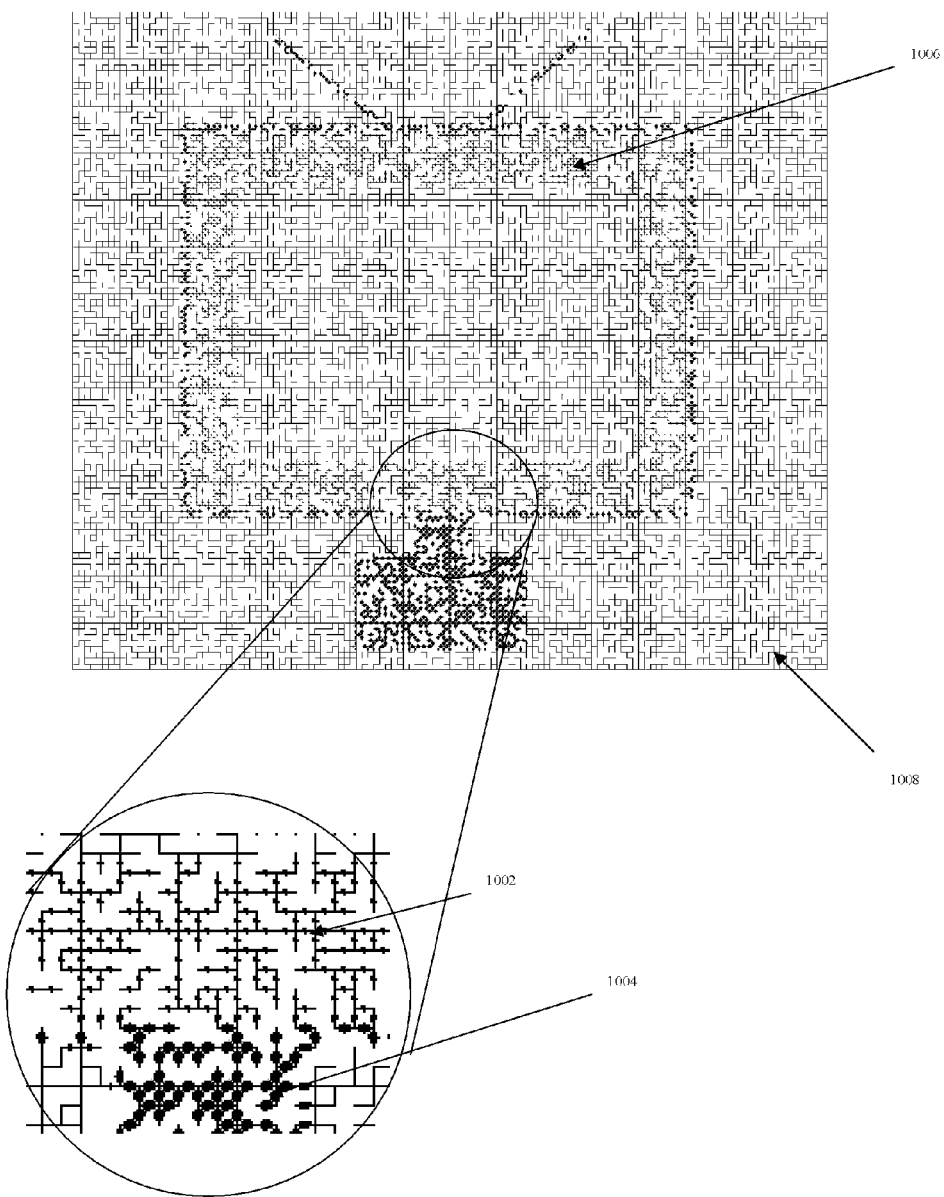

Looking at FIGS. 1-3 it is immediately apparent that the HD Symbol is different from previous 2-D barcodes. Unlike them, the information is not encoded in blocks, dots, hexagons, squares or varying width lines, but by lines 104. In one embodiment, the lines are of uniform thickness. It is critical to denote that unlike the previous absence/presence codes, which encode the information in the above mentioned modes (e.g. blocks, dots, etc.), the HD Symbol encodes information within lines in both the horizontal 104 and vertical directions 106 within the same block 102, thus created a bi-directional code. While the information is basically encoded in the absence or presence of a line travelling in either the horizontal direction (for the horizontally encoded bits/byte tracks) or in the vertical direction (for the vertically encoded bits/byte tracks), in an alternate embodiment the lines may be augmented by varying their thickness, or having a circle, diamond or other shape embedded along their length for optical effect reasons (FIGS. 9-10). Each block has a solid border 110, which is shared with neighboring blocks. Within the block 108, there are seven horizontal byte tracks (302, 304, 306, 308, 310, 312, 314) and seven vertical byte tracks (316, 318, 320, 322, 324, 326, 328).

Thus, each line represents a bit. If a line is present, the piece represents a one (1), if a line is missing; the piece represents a zero (0). Each track consists of 8 pieces, and encodes a single byte. The seven vertical tracks split each horizontal track into eight pieces ($hb_8$, $hb_7$, $hb_6$, $hb_5$, $hb_4$, $hb_3$, $hb_2$, and $hb_1$) representing the most to least significant bits of the horizontal bytes ($B_1$ through $B_7$), and the seven horizontal tracks split each vertical track into eight pieces ($vb_8$, $vb_7$, $vb_6$, $vb_5$, $vb_4$, $vb_3$, $vb_2$, and $vb_1$) also representing the most to least significant bits in each of the vertical bytes ($B_8$ through $B_{14}$).

Each block encodes these seven bytes horizontally ($B_1$ or through $B_7$) and seven bytes vertically ($B_8$ through $B_{14}$) for a total of 14 bytes. As can be seen, these bytes are numbered from 1 to 14 ($B_1$ through $B_{14}$) where $B_1$ is the highest row (horizontal track), $B_2$ is the second highest row, etc., and $B_7$ is the lowest row, $B_8$ is the leftmost column, $B_9$ is the second leftmost column, etc. and $B_{14}$ is the rightmost column.

In one embodiment, Bytes 1 through 12 ($B_1$-$B_{12}$) encode data, with bytes 13 and 14 ($B_{13}$-$B_{14}$) are used for block error correction. Fixing the number of bytes of error correction at two, without any ability of variability being in the hands of the user (as is with the group error correction), allows for the detection and correction of up to a one (1) byte error in a block. Thus if a block has more than a single byte error, the probability of detecting this condition is roughly 95%, and the probability of a mis-correction is roughly 5%.

In an alternate embodiment, the designer may elect to user a higher level of block error correction (preferably in multiples of two, from 2 to 12). Such a move would limit the data carrying capacity but increase the robustness of the code.

Again, unlike the second level of error correction, this block level ECC must be determined a priori (or else all combinations must be tried).

Besides the 14 bytes in each group, there is an additional byte per group called a "prefix code". This prefix code's value is used in the encoding and generation of the block ECC byte values ($B_{13}$ and $B_{14}$), as a phantom $15^{th}$ byte in the block's data string. Thus, in one embodiment, block error correction actually operates on 15 bytes, not 14. The first byte is the prefix code which is not actually part of the symbol. If the prefix code is known, then the 2 bytes of error correction can detect and correct all one-byte errors within the block. If the prefix code is not known, then the 2 bytes of error correction can be used to determine the prefix code, provided that the block has no other errors.

Using said prefix codes means a symbol with major damage can be reconstructed. Even if all four edges are torn or missing, depending upon the size of the symbol and the amount of error correction, it may still be possible to determine the size of the symbol and the location of the readable portion of the symbol.

Figure 5:
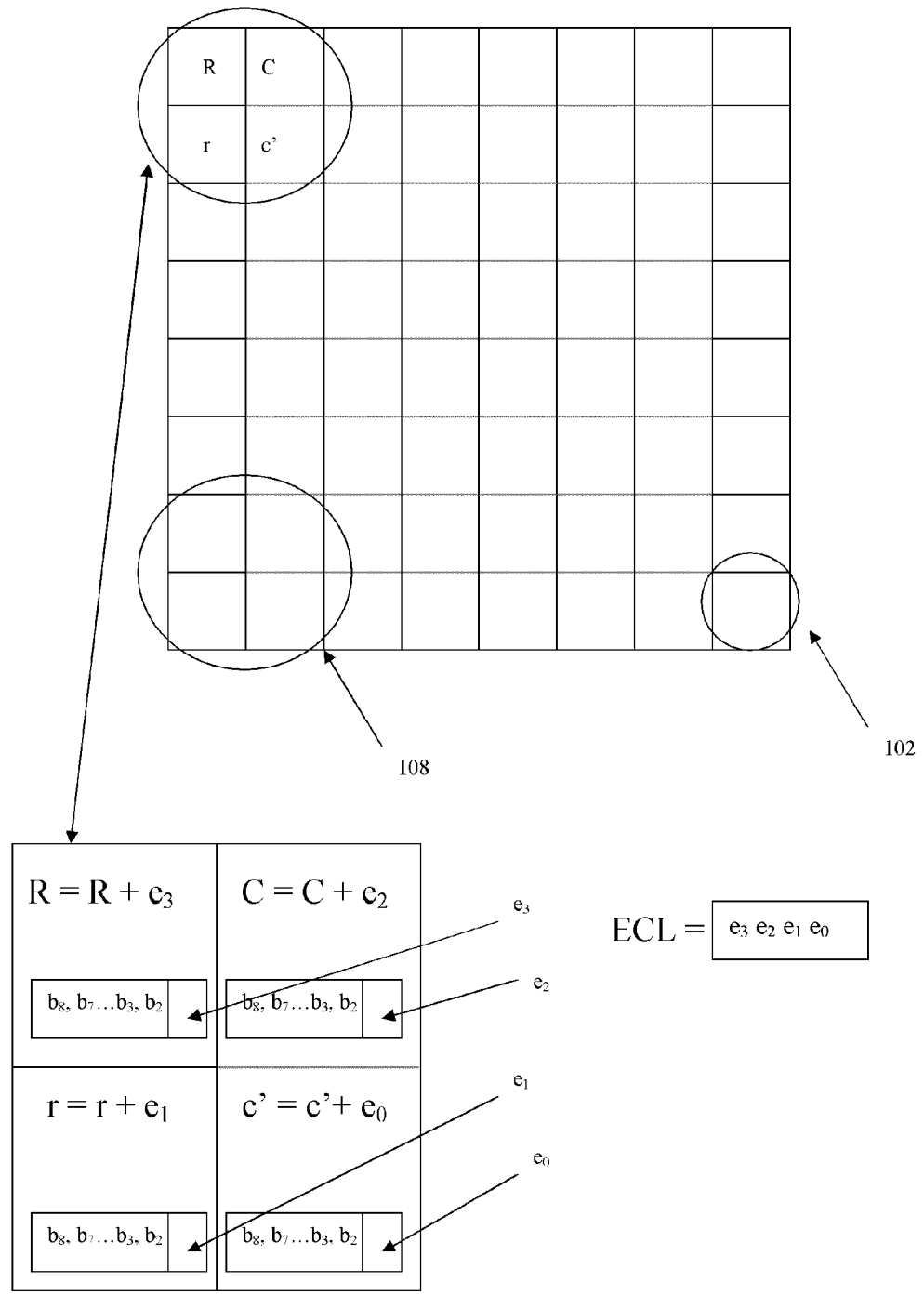
FIG. 5 shows an illustration of the prefix generation mapping and structure according to an exemplary embodiment of the invention.

The prefix code is partly determined by the size and geometry of the symbol (FIG. 4A and FIG. 5), as well as by a least significant bit combination that denotes the group level ECC (explained in detail below). It is a function of the size of the symbol, the position of the block within the symbol, and the amount of group error correction in use. Rows and columns are numbered starting at 1. The table in FIG. 4A shows how to compute the prefix code. FIG. 5 illustrates both the structure and a couple of examples of the values of the prefix code (without the Least Significant Bit (LSB) value. The LSB of the prefix code is determined by the group ECC level selected by the user.

In addition to block error correction, HD Symbol employs group error correction. In one embodiment, regardless of the amount of data in a symbol, every 48 bytes of data (called a data group, which in one embodiment is filled by the 12 bytes of data within each block ($B_1$ through $B_{12}$)) will be encoded into a data string having a certain amount of data bytes, and a complementary amount of ECC bytes. This second, so called higher level ECC is also based on the well known Reed-Solomon error correction algorithm In one embodiment, as seen in FIG. 4B, there are sixteen levels of error correction robustness, each having a larger amount of symbol space consumed by ECC bytes. These range from level "0", where for each 48 byte data group, 44 are devoted to data and four to ECC, to level "15", where for each 48 byte data group, 14 bytes are dedicated to data, and 34 bytes to ECC.

Since sixteen levels only require four bits to encode FIG. 5, it is possible to use the least significant bit of the characters R, C, r and c' to encode the ECC-level as shown. The group error correction is determined by the user when generating a symbol, and fixed for the one or more 48 byte data groups (or portions thereof) that make a symbol. The 16 levels of group ECC may be represented by a 4 bit binary symbol (e.g. 2 is 0010, 10 is 1010, 15 is 1111, etc.), where the descending bit positions ($b_3, b_2, b_1, b_0$) fill the least significant bit of R, C, r, c' respectively.

In one embodiment, you select a 48 byte data group. You take the amount of data from the overall message fill those portions of the data groups that will fit within the one or more 48 byte data groups (again, in one embodiment from 4 to 34 bytes of overhead per 48 byte data group will be dedicated to Error correction), then generate those 4 to 34 bytes of ECC error check bytes (which will be placed within the data group) by calculating the systematic Reed-Solomon encoding using the Galois Field.

The polynomial arithmetic for the Reed-Solomon calculation is identical to that used in the Data Matrix ECC 200 calculations (per the ISO 16022 specification). It is calculated using bit-wise modulo 2 arithmetic and byte-wise modulo 100101101 (decimal 301) arithmetic. This is a Galois field of 28 with 100101101 representing the field's prime modulus polynomial: $x^8+x^5+x^3+x^2+1$. The generator polynomial is calculated for each block depending on its particular value of error correction. Because error correction calculations of this type are well known to those skilled in the art, the structure and operation thereof will not be described in detail herein.

Figure 6A:
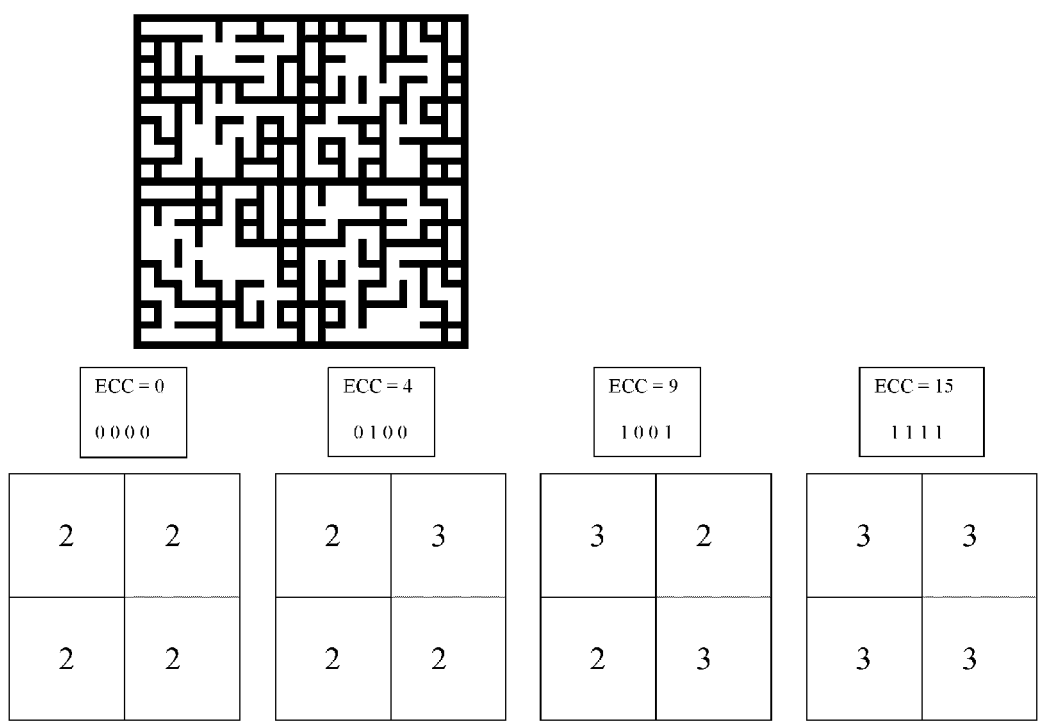
FIGS. 6A and 6B show an illustration of exemplary prefix codes for various sizes and group-level ECC values, according to an exemplary embodiment of the invention.

Thus, as seen in FIG. 6A (a 2×2 symbol (referring to the number of blocks)), various combinations of ECC levels show the variation in the prefix codes. When the user selected level of ECC is a level "0", the four blocks have the following prefix values, R=2, C=2, r=2 and c'=2. When the ECC level is "4" (binary 0100), the prefix values are R=2, C=3, r=2 and c'=2. When the ECC level is "9" (binary 1001), R=3, C=2, r=2 and c'=3, finally when the ECC level is "15" (binary 1111), R=3, C=3, r=3 and c'=3.

Figure 6B:
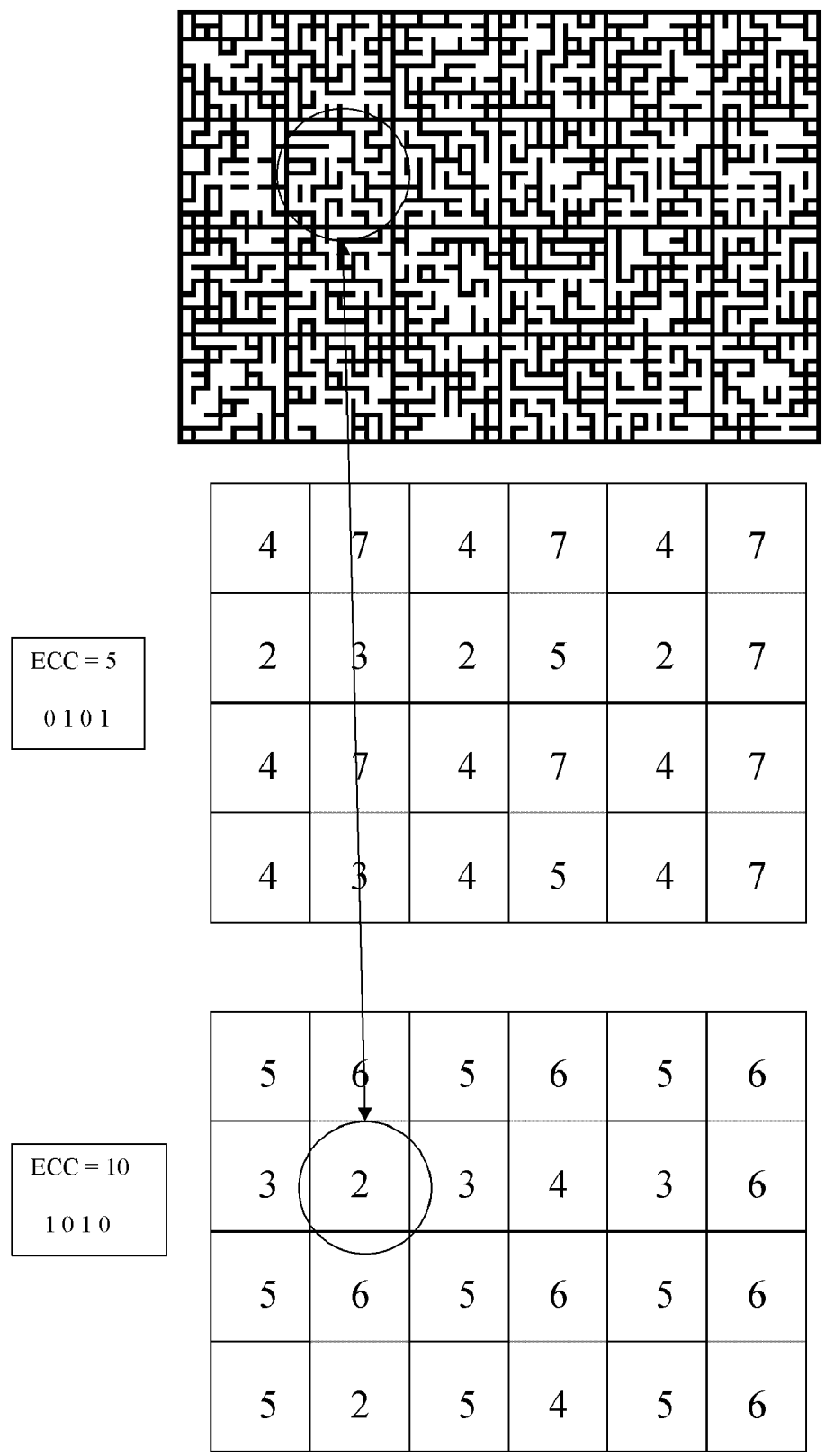

In FIG. 6B, we have a more complex symbol, a 4×6 matrix of blocks. As shown, when the ECC level is 5 (binary 0101), the R=4, C=7 (6+1), r varies across (row 2 is all 2's, row 4 is all 4'), and c' varies from 3 (2+1), 5, 7. Similarly, when the ECC level is 10 (1010), the R and r values are affected, with the C and c' values remaining with a "0" in their least significant bit location.

Figure 7:
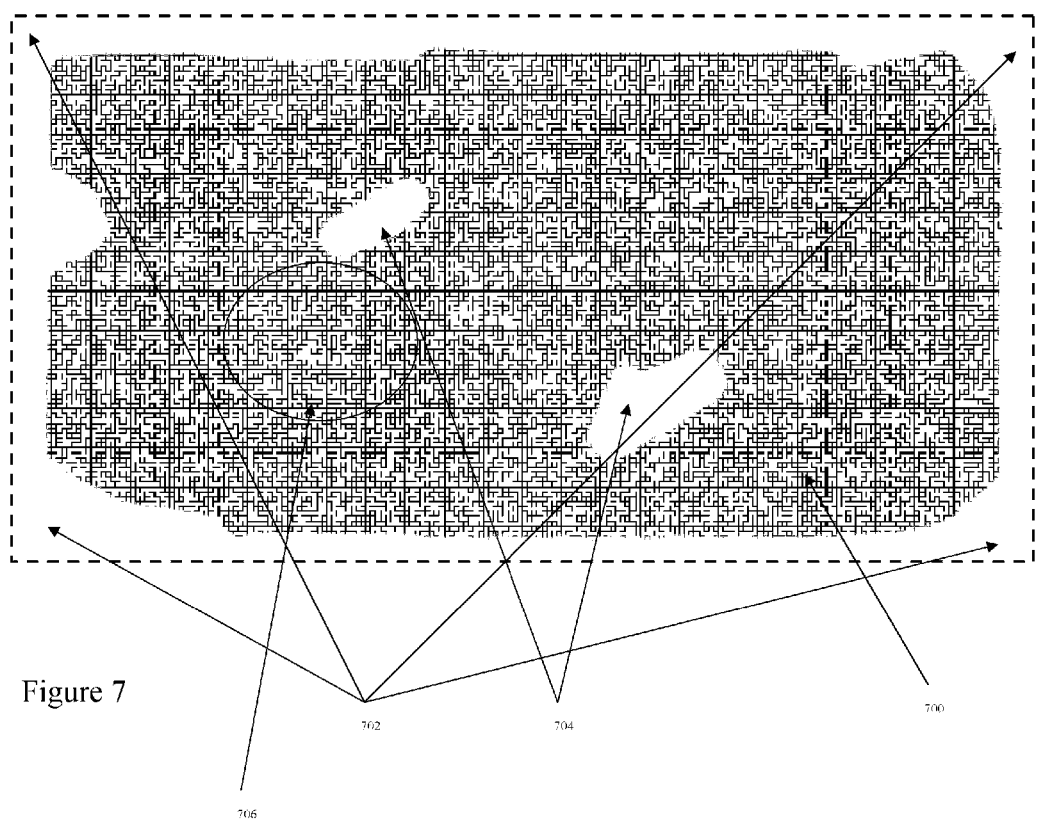
FIG. 7 shows an illustration of a severely mutilated HD Symbol, according to an exemplary embodiment of the invention.

As stated, the prefix itself is not encoded in the symbol, but used for solving the block ECC equation. In one embodiment, they are a very powerful way to find out how large the symbol is, and in which primary orientation (left to right, up to down, right to left, down to up) you should be scanning the lines (based on the image of the symbol), even when the blocks representing the periphery are entirely gone. As seen in FIG. 7, it even allows you to decode a symbol 700 whose complete periphery 702 has been lost (as is won to happen to certain tickets or forms of ID), as well as portions of the inside 704.

The above is possible, for once the decoder can decode six or more neighboring blocks 706, it can verify the orientation of the symbol (straight up), the number of (R)ows (14), the number of (C)olumns (26), one or more particular (r)ows and one or more particular (c')olumns. From these, you have the group error correction level (by decoding the prefix code for any four or more contiguous blocks (which provides the least significant bits $e_3, e_2, e_1, e_0$). With this, the blocks (and superblocks) that are missing are identified. Based on this simple amount of missing information vs. group ECC level, the decoder may proceed to signify the impossibility of decoding (rather than wasting power and cycles trying it over and over).

Placing the group bytes within the symbol may be done in a number of ways. Preferably, you would like to ensure that losing a block (and its 12 bytes of group data/ECC) don't wipe out a particular group. In one embodiment, this is accomplished by interleaving the data geographically within the symbol. To do this, we take the first data group (containing all the bytes of data that fit (based on the selected level of ECC) plus the ECC error check bytes generated by the R-S engine, and join them together. These occupy as many 48 byte data groups as are required to encode the desired message.

Placing the one or more 48 byte data groups 850 geographically within the symbol may be accomplished in a number of ways. In one embodiment, the bytes in the first 48 byte data group are entered into the symbol in a concatenated interleaved fashion, starting with the first row, upper left hand side ($B_1$) then going up-down, left-right (all $B_1$'s in each block), followed by all $B_2$'s, the $B_3$'s . . . through the $B_{12}$'s). When the $B_1$ through $B_{12}$ are known for each block, the prefix of each block, plus actual $B_1$ through $B_{12}$ data are used to generate the $B_{13}$ and $B_{14}$ error check bytes for the block using similar Galois Field calculations as for the ECC error check bytes of the group. In effect, the solution for each block requires 15 bytes are used (12 data, plus the Prefix value, plus the two ECC bytes).

In one embodiment, the block ECC is fixed as shown above, 12 data bytes, two ECC error check bytes and the prefix. In an alternate embodiment, other arrangements may be used, typically with pairs of ECC error check bytes (e.g. four, six, eight, ten, twelve) and the complementary number of data bytes (e.g. ten, eight, six, four, two respectively). While there is no explicit mechanism supplied to provide the block level ECC formula (as there is with the group level, where it is built into the least significant bits of the R, C, r, c' values), the information may be known between trading partners, or all possible values may be attempted.

When decoding the block, the symbol provides a unique number of ways in which to accelerate the decoding. The first unknown, is the orientation of the symbol, which may be one of four, effectively 0, 90, 180 or 270 degrees in rotation. (Note that we refer to the N×M matrix that results after well known image processing routines are used to straighten and square the locations of the lines in the scanned image. This accounts for scanner/imager skew, rotation or pitch when imaging the symbol). In one embodiment, the decoder proceeds to extract the data for one or more blocks in all four possible directions, until it finds two blocks that are decodable in the same orientation. There are 65,536 combinations of the 2 error correction bytes. If successful, it is because there were either no errors at all (1 case), or a single error. For a single error, there are 15 positions that could be fixed, and each position could be XORed by 255 possible combinations of bits. So there are 1+15×255=3,827 ways to be a valid correction. 3,827/65,536 is 5.84%.

Unlike other symbologies, the two effectively separate ECC levels (Block and Group) provide every HD symbol with the ability to determine the correct decoding of individual blocks (which is performed through a block level ECC computation, with no knowledge of the group ECC level (and thus when possible, ensures you have decoded the 14 bytes (12 data, 2 ECC) of any particular block correctly)). This allows for the decoding of individual blocks to effectively start with any particular block, and expand anywhere else in the symbol. In effect, you can really lose the complete periphery of a symbol, as well as any portion of the interior, and as yet extract enough information from the surviving blocks to know what you are missing, and where FIG. 7.

Once you've ascertained the correct orientation (from decoding one or more blocks using block level ECC), you proceed to extract the bytes for each block by extracting the values for each bit represented in the image, thus creating the values for bytes $B_1$ through $B_{14}$. In one embodiment, you continue the decode process (now that you know the orientation of the symbol), by decoding four or more blocks that contain no errors (which is proven by the fact that the block level ECC works). These 14 bytes of correct information, allow you use the 2 error correction bytes to solve for the particular block prefix code. Once you have at least four distinct prefix codes, based on their geographic location, you can then find out the total size of the code (R and C), as well as the particular row r and column c' (i.e. the specific row and column for each block). With the above information, you can then go to the blocks that had errors, and attempt to use the 12 bytes of data, plus their prefix code byte, (deduced from the geography/geometry), to see if you can solve the block information using the ECC error check bytes ($B_{13}$ and $B_{14}$) allow you to decode the missing byte within the block. If so, you now have 12 correct bytes for each block so decoded. If the block has more than one byte of error, you still take that data (with errors) and use it to assemble the 48 byte data group.

From the prefix codes, you now know group ECC level (It is the least significant bit in each member of the superblock FIG. 5), and proceed to use this knowledge to assemble the data groups as shown below. With the bytes forming the data group, and the known ECC-level, you can attempt the decoding of each data group. This is done following well known Reed-Solomon rules. If there are enough ECC group error check bytes to account for any mis-scanning or symbol damage, the R-S engine provides you with a correct decoded message. These are then generated and the complete symbol generated.

Figure 8A:
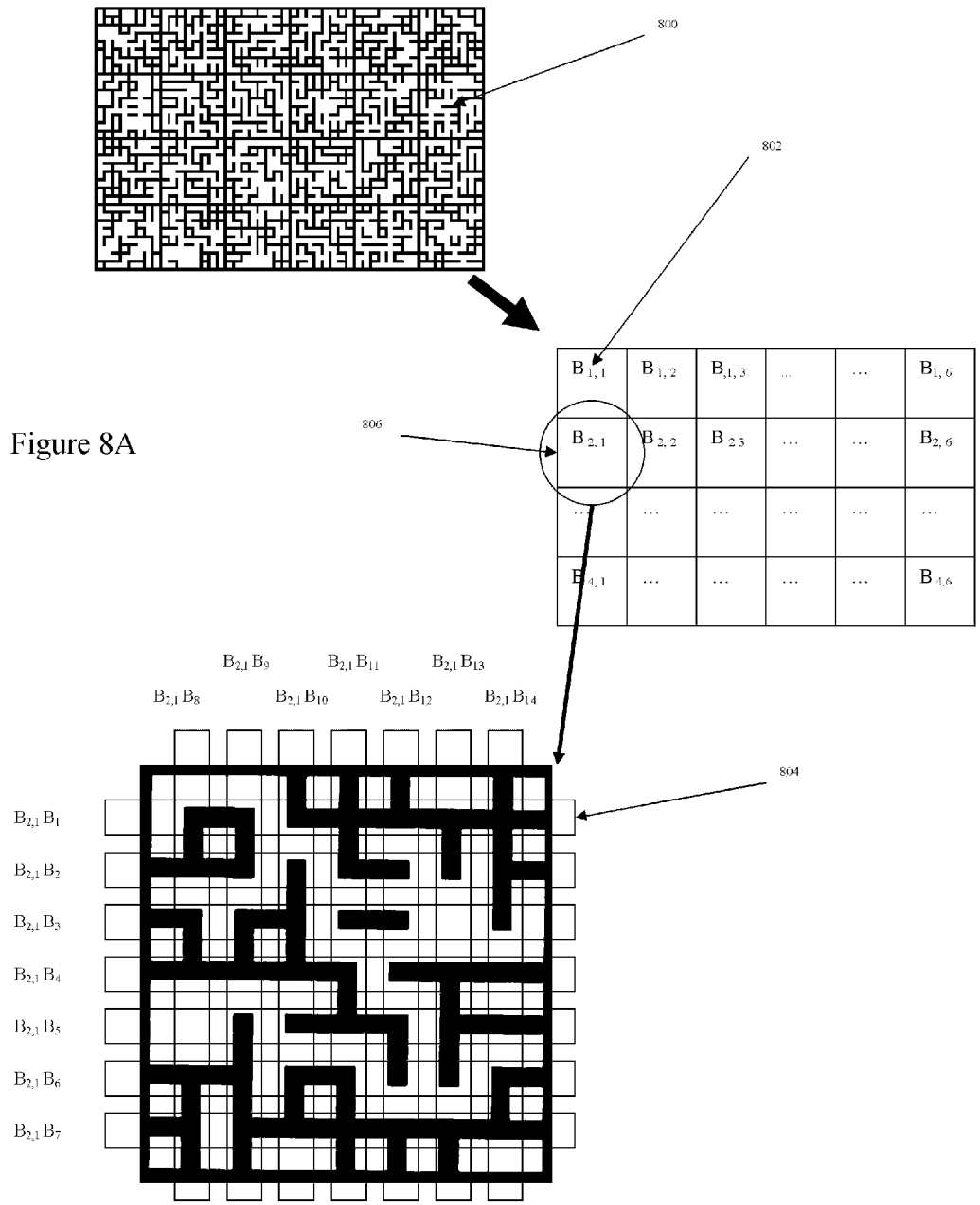
FIGS. 8A and 8B show an illustration of the byte arrangement and concatenation within 48 byte data groups in relation to an HD Symbol, according to an exemplary embodiment of the invention.
Figure 8B:
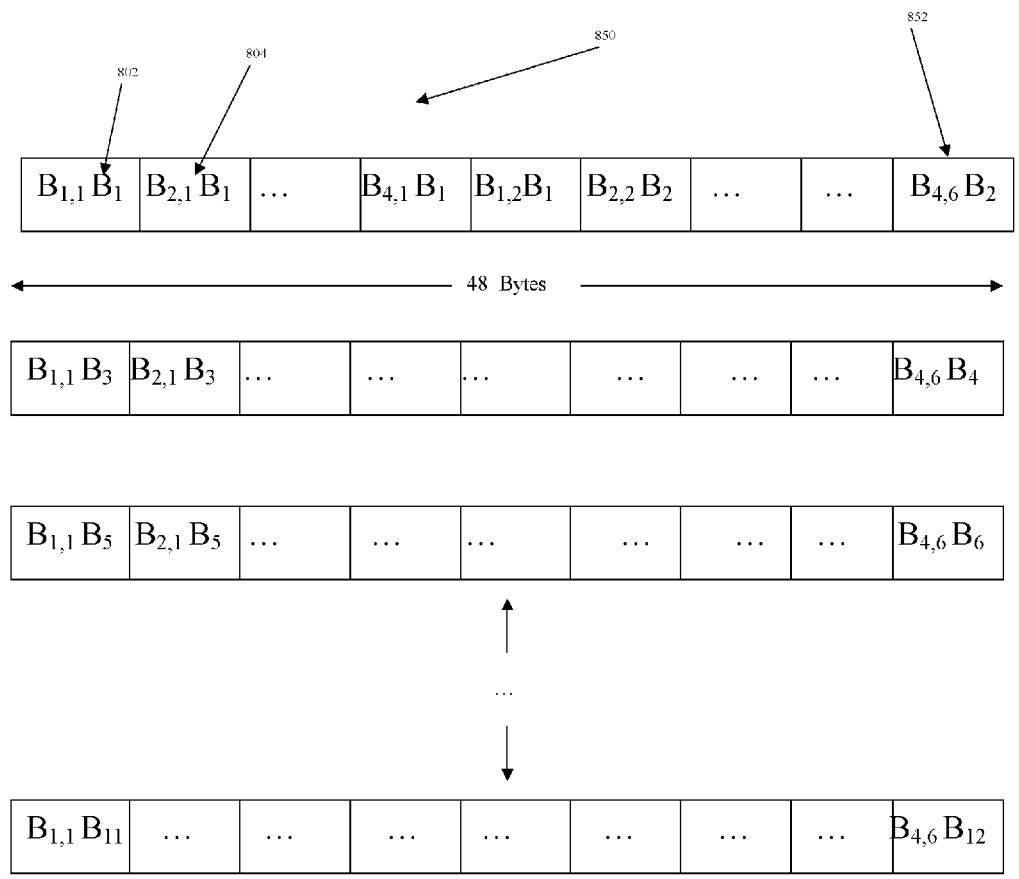

The following example from the HD symbol 800 from (FIGS. 8A-B) best illustrates one embodiment of the above data distribution. In it, the first data group (comprised of the first 48 bytes of information plus the appropriate number of ECC group error check bytes) is assembled as block bytes $B_1$ through $B_{12}$, (the block ECC error check bytes $B_{13}$ and $B_{14}$ are not encoded into the data group), by concatenating the first row byte ($B_1$) 302 from the first Block ($B_{1,1}$) 802, then $B_1$ 804 from the block below $B_{1,1}$, which is $B_{2,1}$ 806, through $B_{4,1}$, (that is, the complete first column going "down" of all first row bytes $B_1$). The next byte within this first data group 850 is $B_1$ from the top of the second column $B_{1,2}$ and so forth until the first 48 bytes are located within the symbol. Once you get to the end of the $B_1$ bytes from each block ($B_1$ of $B_{4,6}$ in this example). Since it happened before you filled the 48 bytes of the first group, you then continue with $B_2$ of Block $B_{1,1}$ 802, $B_2$ of $B_{2,1}$ etc., until the 48 bytes are collected (of course, the reverse is how the symbol was built). This is byte $B_2$ of Block $B_{4,6}$ 852.

In this example, the final byte us $B_{12}$ of Block $B_{4,6}$. Because the ECC is generated via the data groups, there is no need to wait until the final data group is extracted. The decoding (which may include the need to use the ECC error check characters for each separate data group) may be may be accomplished as soon as the particular 48 bytes from each data group are assembled. Every time you reach a 48 bytes 802, you have a group, and you start the next 804. If the symbol is not large enough to fill the 48 bytes, the remainder characters are padded. In one embodiment, they are alternately filled with ones (1) and zeros (0), to prevent a "blank" or "dark" patch in the symbol. In an alternate embodiment, they may be randomized using any suitable routine. ISO 16022 suggest a couple of appropriate methods.

It is important to note that the data going into the bytes $B_x$ of each Block $B_{n,m}$ described above, is comprised of data, plus the ECC bytes per the selected ECC level. That is, every ECC block is a self contained group capable of being solved through the reed Solomon solution. In an alternate embodiment, the data is all grouped as described, and the ECC bytes are separately encoded in their own blocks.

As previously explained, the data stored in the data space of the symbology of the invention may be of two kinds, message data and check data (also known as "checkwords") that are joined together into a string of data blocks and read out in a sequence. It will be obvious that the order and direction in which the string is first printed and then read is not fundamentally important so long as that order and direction are used and interpreted consistently. With all such data stored in memory, the apparent differences between such directions merely reflect whether successive addresses are generated by incrementing or decrementing earlier addresses.

In addition, it is well known in error correction algorithms, that it is often preferred to have erasures, rather than mis-interpreted bytes. For this reason, there are advantages to having the knowledge of what portions of the code are simply missing, over misinterpreting background material (fingers, etc.) as mis-read blocks or groups. Two separate levels of Reed Solomon error correction are used. Each block has a low-level error correction that can correct all one-byte errors and detect most multi-byte errors. Invalid blocks are treated as erasures by the high-level error correction. Knowledge of erasures improves the performance of the high-level error correction by a factor of 2. Most 2D symbologies are unable to take advantage of erasures because there is no way to distinguish known errors from unknown errors.

In one embodiment, the HD Symbol may be used in combination with a user's desire to advertise or highlight their company, product, service or event. As seen in FIGS. 9 and 10, in one embodiment, the outline of a ball 902 within the HD Symbol 904, could be created by creating a bulge or other shape within the line, specifically at its significant middle point, which is the point where the graphic extractor will "read" whether a line or space is present. The addition of such a bulge within the line, creates an optical effect that the human eye discerns as a known graphic. As seen in the close up 906, where there is a line, in one embodiment a rectangle is added to the line 908. In alternate embodiments, a circle, square, diamond, triangle, dot or other such wider/larger mark may be used. Notice that the spaces or blanks where there was no mark are left as before. The human eye, however, senses difference, and proceeds to "fill in the blanks", in effect allowing you to see the desired outline. Unlike some other 2D codes, where the graphics are added at the expense of symbol damage, doing the above embossing is allowable by the user (and hence the product is enhanced), without any discernible loss of readability.

Similarly, as seen in FIG. 10, two or more features may be added to the lines (small squares 1002 and large squares 1004 in all mapping location where there corresponds a line and a mark to create an outline would be desired. In this fashion, a representation reminiscent of grey level dithering of the desired outline creates the illusion of a multi-tone (not merely black and white) image illusion within the HD Symbol 1008, of a TV 1006.

In an alternate embodiment, the reverse image may be desired, in effect making a mark in every line "but" the TV or ball. The key to the above, is that embossing, enhancing, or thickening partially or totally the lines, accomplishes an optical illusion without significantly altering the decodability of the symbol.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

What is claimed is:

1. An optically readable two dimensional symbol, comprising:
    a finder structure comprised of a solid border defining the perimeter of an area, said border being shared with neighboring areas, each of said areas having first and second major axes which are substantially perpendicular to one another;
    each said area having within its perimeter an internal bi-directional data representation structure comprised of one or more locations in each of the horizontal and vertical directions, named respectively rows and columns, with each of row being filled with one or more horizontal lines or spaces, and each column being filled with one or more vertical lines or spaces, in order to represent the zero or one bits of a binary signal;
    a data block representation structure formed by the grouping into bytes of said bits, said block being comprised of one or more block data bytes and two or more block error check bytes that encode error correction data for the block;
    an overall symbol data representation structure comprised of one or more data groups, each said group comprised of three or more data bytes from said data blocks, with each group containing one or more data bytes and two or more group error check bytes that encode error correction data for each said individual group, the ratio of group bytes to error correction check bytes being selectable from one or more discrete group ECC levels; and
    a superblock structure used to define a prefix value for each said data block, said superblock being formed by the grouping of four neighboring data blocks, wherein said prefix value is a function of each individual data block geographic location within the symbol and the symbol ECC level.

2. the symbol of claim 1 wherein;
    the area defined by the perimeter is square, each said data representation row is comprised of lines representing eight bits, and each said column is comprised of lines representing eight bits, the data block is comprised of seven horizontal rows and seven vertical columns, with each said column or row representing a byte, each block is comprised of twelve data bytes and two block error check bytes, the data groups are comprised of 48 bytes, and there are sixteen discrete user selectable group ECC-levels.

3. the symbol of claim 2 wherein;
    the significantly central portion of some of the said vertical and/or horizontal lines is augmented by the creation of a bulge, block, dot, square or such other feature.

4. the symbol of claim 1 wherein;
the significantly central portion of some of the said vertical and/or horizontal lines is augmented by the creation of a bulge, block, dot, square or such other feature.

5. An optically readable two dimensional symbol, comprising:
- a finder structure comprised of a solid border defining the perimeter of a significantly square area, said border being shared with one or more neighboring areas, each of said areas having first and second major axes which are substantially perpendicular to one another;
- each said area having within its perimeter an internal bi-directional data representation structure comprised of seven horizontal and seven vertical directions, named respectively rows and columns, with each of row being filled with eight horizontal lines or spaces, and each column being filled with eight vertical lines or spaces, in order to represent the zero or one bits of a binary signal;
- a data block representation structure formed by the grouping into fourteen bytes of said eight bits, said block being comprised of twelve data bytes and two error check bytes that encode error correction data for the block;
- an overall symbol data representation structure comprised of one or more data groups, with each said data group containing one or more data bytes and two or more group error check bytes, and the total number of bytes in the each group being 48 bytes for each said individual data group, the ratio of group bytes to error correction check bytes being selectable from one of sixteen discrete group ECC levels; and
- a superblock structure used to define a prefix value for each said data block, said superblock being formed by the grouping of selected four neighboring data blocks, wherein said prefix value is a function of each individual data block geographic location within the symbol and the symbol ECC level.

6. the symbol of claim 5 wherein;
the significantly central portion of some of the said vertical and/or horizontal lines is augmented by the creation of a bulge, block, dot, square or such other feature.

* * * * *